United States Patent [19]
Fredrikson et al.

[11] 3,971,547
[45] July 27, 1976

[54] APPARATUS AND METHOD FOR REFINING METAL

[75] Inventors: Bengt Fredrikson, Vasteras; Karl-Erik Öberg, Hagfors, both of Sweden

[73] Assignee: Allmanna Svenska Elektriska Aktiebolaget, Vasteras, Sweden

[22] Filed: Aug. 22, 1974

[21] Appl. No.: 499,759

[30] Foreign Application Priority Data
Aug. 23, 1973 Sweden............................ 73114647

[52] U.S. Cl............................... 266/244; 13/2 R; 266/236
[51] Int. Cl.[2].......................................... C21C 5/46
[58] Field of Search .................. 266/34 A, 35, 36 P, 266/41; 13/2, 29, 30; 75/51, 52, 59, 60

[56] References Cited
UNITED STATES PATENTS

| | | | |
|---|---|---|---|
| 1,031,257 | 7/1912 | Green .................................... | 13/29 |
| 1,769,223 | 7/1930 | Isliker ................................... | 75/63 X |
| 3,216,070 | 11/1965 | Woodburn ........................... | 266/38 X |
| 3,618,917 | 11/1971 | Fredrikson.......................... | 266/34 A |
| 3,721,432 | 3/1973 | Buhrer et al........................ | 266/38 |
| 3,764,124 | 10/1973 | Le Moyne............................ | 266/38 |

FOREIGN PATENTS OR APPLICATIONS
| | | | |
|---|---|---|---|
| 1,214,436 | 4/1960 | France............................... | 164/335 |

*Primary Examiner*—Gerald A. Dost
*Attorney, Agent, or Firm*—Kenyon & Kenyon Reilly Carr & Chapin

[57] ABSTRACT

A metal-refining converter comprises an elongated vessel for containing a melt to be refined and which tilts so that it can be positioned upright or horizontal. This vessel has an upper end having a charging opening provided with a removable gas-tight cover and a lower end provided with a channel-type inductor, and the vessel has a closable tap hole in its side which is downward when the vessel is horizontal. The vessel is charged with the melt to be refined, via its charging opening. With the vessel upright, the vessel is provided with means for injecting refining material into the melt while it is heated by the inductor. After the refining period, the vessel is tilted to its horizontal position, the vessel having an internal contour such that a space is formed over the melt, the gas-tight cover being applied at that time. Non-oxidizing gas is injected into the vessel and with the inductor continuing to heat the melt, the latter is tapped via the tap hole. Control of the gas pressure within the vessel and of the electric power applied to the inductor, permits tapping to be effected, for example, via bottom pouring into ingot molds, at a constant rate and temperature. With these two normally varying factors under complete control, high-quality castings are obtained.

1 Claim, 8 Drawing Figures

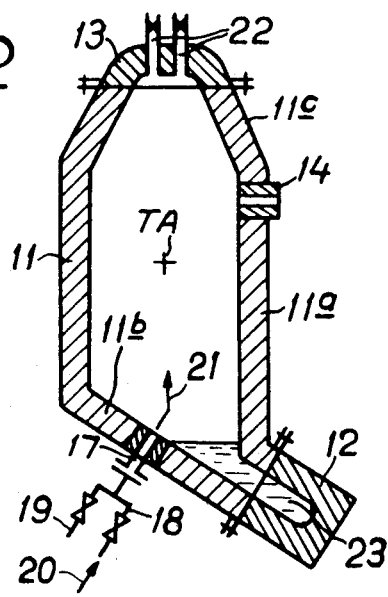
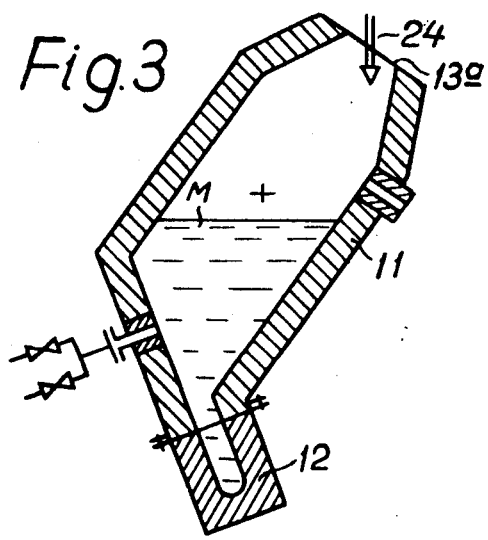
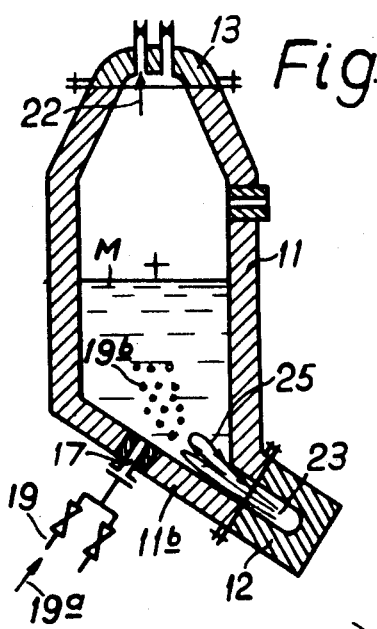
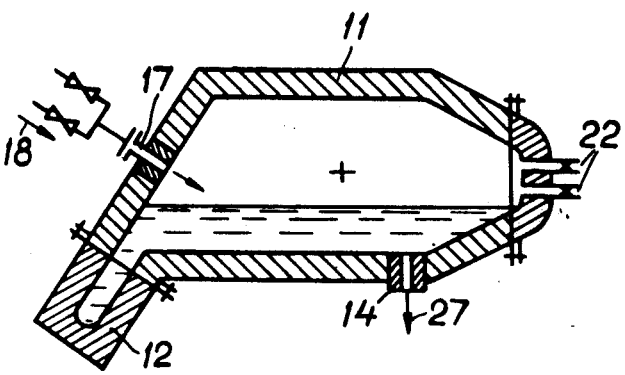
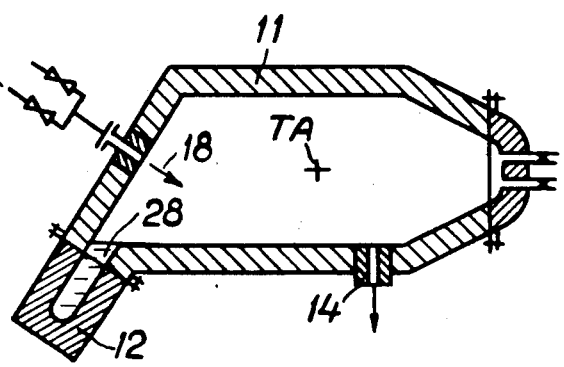

APPARATUS AND METHOD FOR REFINING METAL

BACKGROUND OF THE INVENTION

Channel-type electric induction furnaces have been used to refine liquid metal melts prior to their being cast.

One example is the use of such a furnace as a converter, into which a steel melt is charged for desulfurization, powdered lime being injected into the melt. The furnace may be of the tilting type, the refining action being effected while the furnace is upright, after which the furnace is tilted and the refined melt poured for casting.

Such a furnace may have a gas-tight cover which is applied after charging, it may be provided with means for injecting non-oxidizing gas into its interior, both before and after charging, and it may have a tap hole which is opened after the furnace is tilted and through which the refined melt may be tapped, the tilting of the furnace to a diagonal position positioning the melt for such tapping.

This expedient has had various disadvantages. The usual tipping channel-type induction furnace is not especially designed to be used as a converter. Its production rate is undesirably low. The temperature of the melt cannot be controlled easily during tapping and it is difficult to maintain a constant pouring or tapping rate. The result is that it is very difficult to obtain high-quality castings.

SUMMARY OF THE INVENTION

The object of the invention is to provide a converter heated by a channel-type inductor, and which can be kept in operation continuously with the temperature and tapping rate of each refined melt under better control than has heretofore been possible.

According to this invention, the converter comprises an elongated vessel for containing the melt to be refined and which tilts so that it can be positioned upright or substantially completely horizontal. The vessel has an upper end having a charging opening provided with a removable gas-tight cover, and a lower end provided with a channel-type electric inductor. The side of the vessel which is downward when the vessel is horizontal, is provided with a closable tap hole and the vessel has an internal contour so that when it is horizontal, it holds the melt above the tap hole with a space above the melt and with the inductor channel positioned to receive and heat the melt. The vessel has means for injecting pressurized-gas, such as an inert or non-oxidizing gas, into this space while the inductor continues to operate, this permitting control of the gas pressure in the space so that the melt can be pressure-cast through the tap hole at any desired rate, while control of the power applied to the inductor permits the temperature of the melt to be maintained as desired. Therefore, it is possible to cast the refined melt through the tap hole at a constant rate and at a constant temperature, so that castings of better quality are obtainable via suitable molds receiving the metal.

The inductor channel extends diagonally from the bottom of the converter and in the direction which is downward when the converter is horizontal. Therefore, the inductor channel, which forms a sump, is always effective, a portion of the melt being retained in this sump after tapping so that when the converter is tilted upright after tapping and emptying, its interior may be kept hot for receiving the next melt to be refined. Refinement proceeds while the converter is vertical, the inductor channel being able to receive the melt at that time to inductively heat the melt. The diagonally extending channel, via the well-known Pinch effect produce stirring currents in the melt which come to a focus, and the furnace is provided with a melt-refining material injecting means which injects such material at least approximately into this focus.

After the refining period, the converter is tilted to its horizontal position, the refined melt is possibly deslagged, and the converter is ready for tapping. The previously described melt-refining material injecting means is in the form of an inlet positioned in the converter's bottom so that it can be used for injection into the lower portion of the melt during the refining while the converter is upright. This location is high enough in the converter bottom when the latter is horizontal, to inject into the space formed above the melt at that time. Therefore, the same inlet can be used for the injection of the pressurized-gas during the tapping, as well as of the refining material during the refining period.

The gas-tight cover may be applied at all times excepting during charging and deslagging. It is provided with valved outlets which are opened during the refining period to permit the escape of gases at that time.

BRIEF DESCRIPTION OF THE DRAWINGS

The presently preferred mode for carrying out the invention is illustrated by the accompanying drawings, in which:

FIGS. 2 through 6 schematically show in vertical section the converter during the successive stages of being empty and holding, charging, refining, tapping and back to the empty condition ready for holding again;

DETAILED DESCRIPTION OF THE INVENTION

Figure 1:
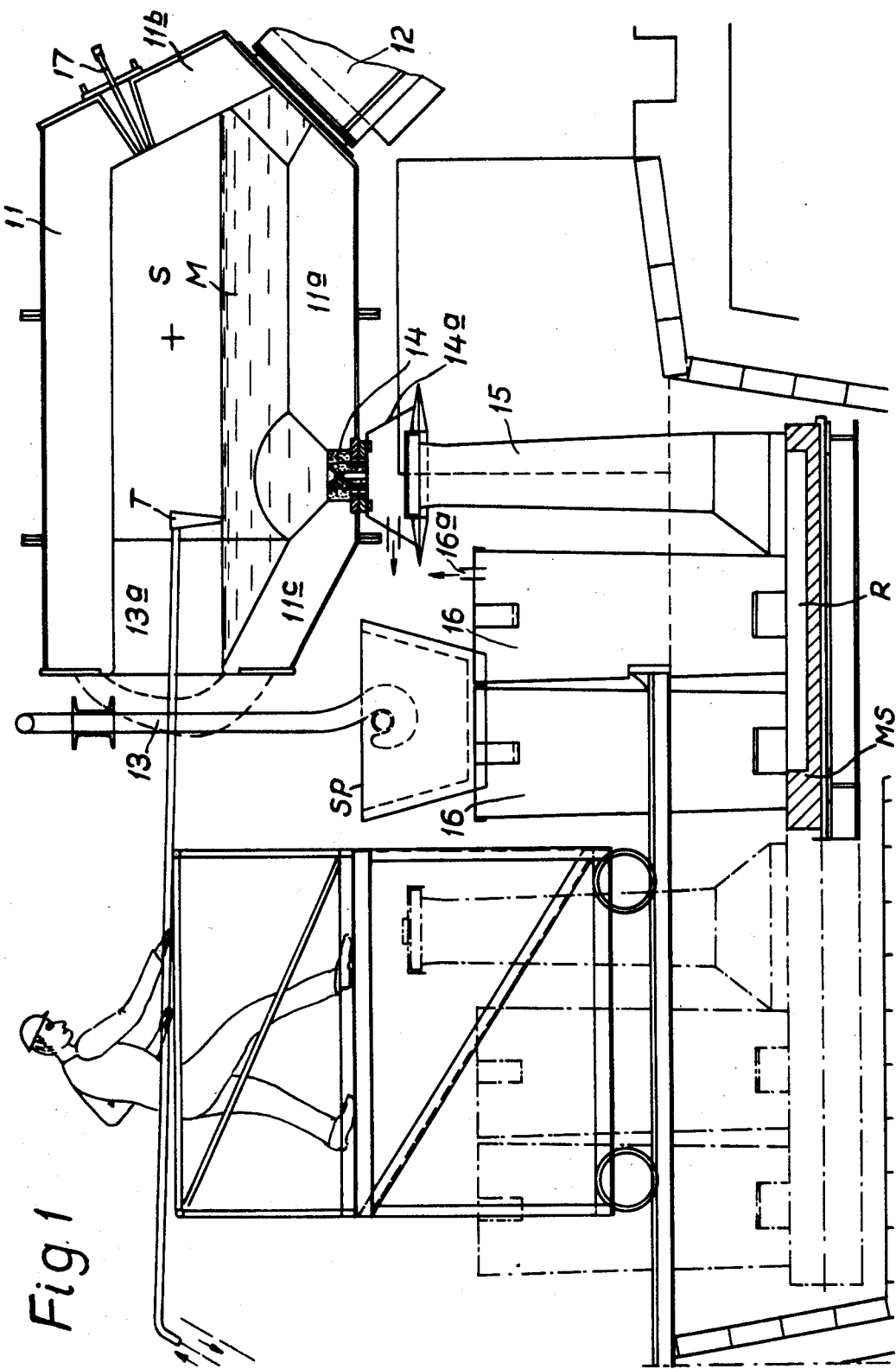
FIG. 1 is an elevation view with the converter in vertical section and providing a showing of the physical arrangement of the equipment associated with the converter.

Having reference to the above drawings, FIG. 1 shows the plant equipment, the converter 11 being deslagged with its channel-type inductor 12 maintaining the melt temperature, the melt having been refined at this time. The gas-tight removable cover 13, indicated by broken lines, is removed so that the workman shown can pull the slag from the top of the melt by using a water-cooled tool T, the slag falling into a slag pot SP suspended by a crane hook so that the pot can be removed after the deslagging.

The converter 11 is tilted to its horizontal position and after the gas-tight cover 13 is applied to the charging opening 13a in the top of the converter 11, pressurized-gas can be introduced via the pipe connection 17 in the bottom of the converter and which is located to open into the space S above the top level of the melt M. The tap hole 14 is in the side 11a of the converter which is downward when in this horizontal position, and although not shown in this view, the tap hole 14 is preferably provided with an externally operable valve, although it may be plugged and burnt through for tapping. With the space S under the gas pressure of pressurized-gas introduced via the connection 17, and with the inductor 12 in the bottom end of the converter operating, the illustrated casting is of the bottom-pouring type. The fountain 15 receives the tapped melt and carries it to the runner R which opens to the bottoms of a pair of molds 16, preferably having their tops covered and provided with gas outlets as at 16a. The mold stool MS is movable so that the molds 16 can be carried away when filled. Preferably a gas-tight box 14a, which may be evacuated, seals the top of the fountain 15 with reference to the bottom of the side wall 11a surrounding the tap hole 14.

According to the method phase of this invention, the pressurized-gas, which is either non-oxidizing or inert, introduced via the connection 17, is controlled so that the pressure in the space S is such that the melt is cast at a constant rate; at the same time, the temperature of the melt M is kept at a constant temperature by appropriate control of the electric power applied to the channel-type inductor 12. It can be seen that this inductor 12 is oriented diagonally downwardly with respect to the vessel 11 so that its sump, formed by its channel, remains filled with sump metal after complete tapping of the melt, as can be seen by reference to FIG. 2.

In this FIG. 2 it can be seen that the vessel to some degree resembles a Bessemer converter vessel as to contour. In FIG. 2 the vessel has been tilted about its tilting axis TA to its upright or vertical position, the gas-tight cover 13 is applied, and inert gas, such as Argon, is being injected as at 20 and 21, the connection 17 connecting via a valve line 18 with a suitable source of this gas, a second valve line 19 also connecting with the connection 17 for use as described later. The gas-tight cover 13 has valved exhaust outlets 22 which are closed at this time. The diagonally and downwardly extending inductor 12 has its channel 23 filled with the sump metal retained as previously described. At this phase the vessel can be kept hot by the heating of the sump metal in the inductor channel 23. The inductor windings are not shown because they may be made as usual, the sump metal in the channel 23 forming the secondary which is inductively heated by the winding forming the primary of the inductor. The tap hole 14 is closed at this time.

In FIG. 3 the cover 13 is removed, the vessel 11 is tilted to a diagonal position and a melt, such as a steel melt requiring desulfurization, is being charged at 24. At this time, the molten sump metal becomes part of the newly charged melt.

As shown in FIG. 4, the refining period is under way, the refining material being introduced through the connection 17 via the valve line 19 as indicated by the arrow 19a with the newly introduced material being shown at 19b. This material may be anything required for refinement of the melt, powdered lime being appropriate if steel is being desulfurized. The inductive action on the melt in the channel 23 produces the well-known Pinch effect causing stirring forces 25 which come to focus in the melt M where reversal of the currents occur. The vessel 11 has a bottom 11b which slants downwardly and the connection 17 is positioned through this bottom wall so as to open approximately at this focus of the currents. The resulting inductive stirring rapidly places the material 19b in dispersion throughout the melt end. It is to be understood that the refining material is injected into the melt and under pressure exceeding the hydrostatic head of the melt and that this, plus the very effective stirring by the induced melt currents, promoting a very rapid refining operation.

Figure 7:
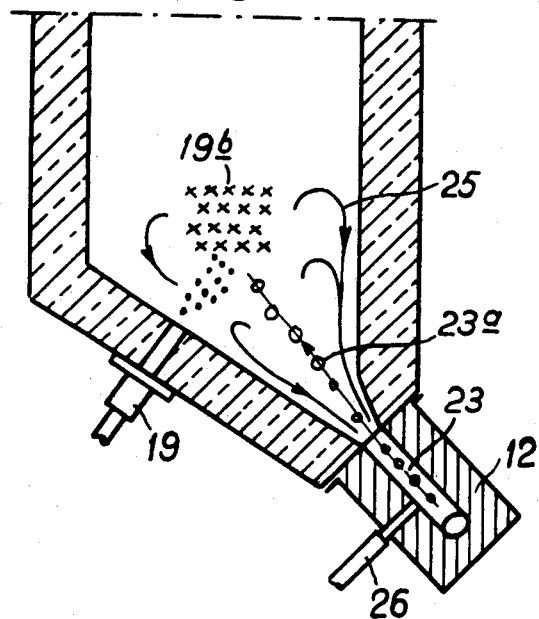
FIG. 7 is a schematic vertical section showing a modification.

FIG. 7 shows this refining operation in more detail and it also shows that at 26 a connection extends in through the channel 23 of the inductor 12 so that an inert, non-oxidizing or reducing gas may be injected under pressure into the channel. This increases the velocity of the induced melt flow in the channel, and more importantly, exerts a cleaning action relative to the channel's wall. Thus clogging of the channel is prevented and the channel temperature is prevented from becoming excessive. The gas bubble formation, indicated at 23a, forces out powdered material, such as powdered lime when used, which might fall down into the channel and adhere to its wall.

The top of the converter tapers or is otherwise shaped to provide an upwardly sloping wall 11c for retaining the melt M during the deslagging operation of FIG. 1. This FIG. 1 shows one contour suitable for this purpose, while FIG. 2 shows that the upwardly inclined wall is provided by the top end of the converter being generally conical. The bottom wall 11b declines downwardly when the converter is upstanding, and downwardly when the converter is horizontal, thus permitting the connection 17 to open into the space S during the casting operation when the vessel is horizontal. In FIG. 5 the melt is casting, as shown at 27.

Figure 8:
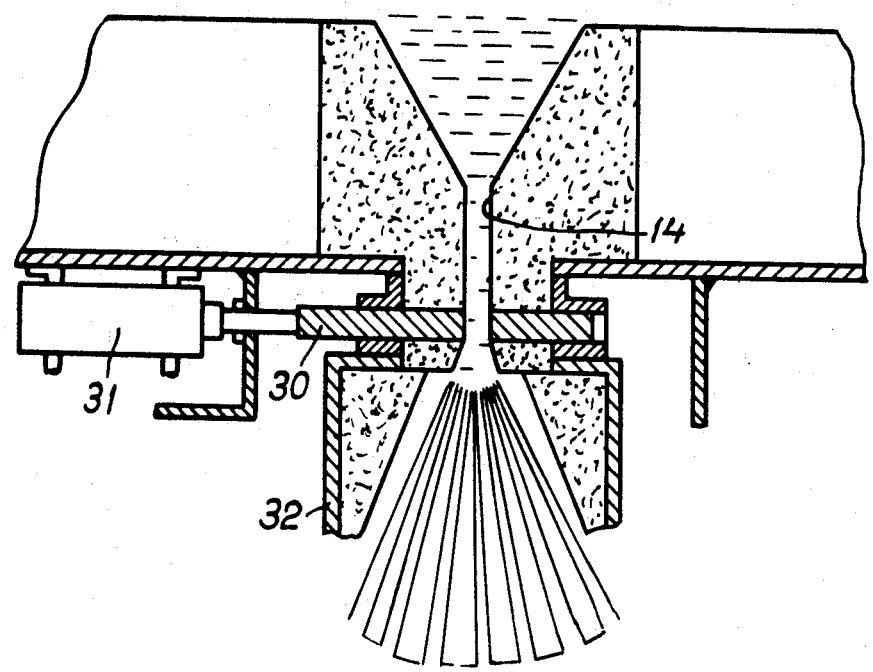
FIG. 8 shows details of the tapping operation.

FIG. 8 shows the tap hole 14 as being controlled by a gate valve 30 powered by a hydraulic or pneumatic cylinder 31. A downwardly extending shield 32 prevents radial splashing of the tapped melt, the melt being discharged under the gas pressure existing in the space S during the tapping operation. The conclusion of the tapping is shown by FIG. 6 where the retained sump metal is shown at 28. The downward angularity of the inductor 12 and its channel 23 relative to the longitudinal axis of the converter vessel, provides that as shown at 28 in FIG. 6 there shall always be sump metal present regardless of the tilted position of the vessel as can be seen from FIGS. 2 through 6.

What is claimed is:

1. A metal-refining converter comprising an elongated vessel for containing a melt to be refined and which tilts so that it can be positioned upright or horizontal, said vessel having an upper end having a charging opening provided with a removable gas-tight cover and a lower end provided with a channel-type inductor and the vessel having a closable tap hole in its side which is downward when the vessel is horizontal, said vessel having an internal contour permitting it when horizontal to hold said melt with a space above the melt, and said inductor having a channel positioned to receive and heat the melt when the vessel is horizontal, said vessel having means for injecting pressurized-gas into said space when the vessel is horizontal, said inductor's channel extending downwardly from said lower side and forming a sump for retaining a portion of said melt after the latter is tapped from said vessel when the vessel is horizontal, and said inductor's channel extending diagonally with respect to said vessel's longitudinal axis so that the inductor can produce heat via said melt portion retained in said sump, when the vessel is tilted upright, said vessel having at least one pipe connection for injecting melt-refining material into the lower portion of a melt charged in said vessel with the latter upright, said cover having an exhaust opening, said inductor by Pinch effect producing stirring currents in said melt which come to a focus in the melt, and said pipe connection pointing towards said focus and injecting said material at least approximately into said focus.

* * * * *